(12) United States Patent
Pfeiffer et al.

(10) Patent No.: US 8,121,389 B2
(45) Date of Patent: Feb. 21, 2012

(54) SYSTEM, APPARATUS, METHOD AND COMPUTER PROGRAM PRODUCT FOR OPTICAL POSITION RECOGNITION

(75) Inventors: Joachim Pfeiffer, Bensheim (DE); Frank Thiel, Ober-Ramstadt (DE)

(73) Assignee: Sirona Dental Systems GmbH, Bensheim (DE)

( * ) Notice: Subject to any disclaimer, the term of this patent is extended or adjusted under 35 U.S.C. 154(b) by 900 days.

(21) Appl. No.: 12/137,338

(22) Filed: Jun. 11, 2008

(65) Prior Publication Data

US 2009/0310146 A1 Dec. 17, 2009

(51) Int. Cl.
*G06K 9/00* (2006.01)

(52) U.S. Cl. .......... 382/141; 382/284; 348/86; 348/125; 356/614; 345/629

(58) Field of Classification Search .................. 385/141; 348/86, 125; 700/95; 382/106, 107, 284; 345/629–641; 356/614–624
See application file for complete search history.

(56) References Cited

U.S. PATENT DOCUMENTS

| | | | |
|---|---|---|---|
| 4,145,803 A | 3/1979 | Tasch, Jr. | |
| 4,837,732 A | 6/1989 | Brandestini et al. | 364/413.28 |
| 5,841,132 A | 11/1998 | Horton et al. | |
| 5,852,675 A | 12/1998 | Matsuo et al. | |
| 6,851,949 B1 * | 2/2005 | Sachdeva et al. | 433/213 |
| 6,885,464 B1 | 4/2005 | Pfeiffer et al. | 356/602 |
| 7,335,876 B2 | 2/2008 | Eiff et al. | 250/234 |
| 7,336,375 B1 * | 2/2008 | Faul et al. | 356/604 |
| 2002/0015800 A1 | 2/2002 | Miyamoto et al. | |
| 2007/0091174 A1 * | 4/2007 | Kochi et al. | 348/135 |
| 2009/0088634 A1 | 4/2009 | Zhao et al. | |
| 2009/0310146 A1 * | 12/2009 | Pfeiffer et al. | 356/615 |
| 2009/0310869 A1 * | 12/2009 | Thiel et al. | 382/201 |

OTHER PUBLICATIONS

"Cercon Eye, The Scanning Module for Cercon Smart Ceramics", printed from http://www.plandent.com/pdf/downloads/Cercon_eye_Folder_GB.pdf, on or about Apr. 25, 2008 (6 sheets).

"Budget Solution—Your Stepping Stone into CAD/CAM! inEos+ infiniDent", printed from http://www.inlab.com/ecomaXL/index.php?site=inEos_Main_Page, on or about Mar. 25, 2009 (2 sheets).

"Cercon Art 2.1 Instructions for Use—Cercon Smart Ceramics—The Zirconia All-porcelain System", DeguDent GmbH, pp. 12-16 (Sep. 2006).

N. Rego, "The Benefits of the New inLab InEos™ Add-on Scanner", Spectrum Reprint, 2005 (3 sheets).

(Continued)

*Primary Examiner* — Aaron W Carter
(74) *Attorney, Agent, or Firm* — Fitzpatrick, Cella, Harper & Scinto

(57) ABSTRACT

A system, apparatus, method, and computer program product for evaluating an object disposed on an upper surface of an object holder. At least one first frame representing a captured portion of the object is acquired, while the object holder is positioned at each of a plurality of locations. At least one second frame representing a captured portion of at least one other surface of the object holder besides the upper surface is acquired, while the object holder is positioned at each of the plurality of locations. At least one spatial characteristic associated with the captured portion of the object is determined, based on at least one of the acquired frames. A three-dimensional representation of the object can be formed based on the first frames and at least one spatial characteristic.

28 Claims, 14 Drawing Sheets

OTHER PUBLICATIONS

"The Sirona Product Portfolio at a Glance—Everything You Need for a Great Day.", Sirona Dental Systems (39 pages).

U.S. Patent and Trademark Office, Office Action dated May 23, 2011, in connection with U.S. Appl. No. 12/323,955, 36 pages.

* cited by examiner

| | | | | | | | | | | | | | | |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
| 16 | 17 | 18 | 19 | 20 | 21 | 22 | 23 | 24 | 25 | 26 | 27 | 28 | 29 | 30 |
| 31 | 32 | 33 | 34 | 35 | 36 | 37 | 38 | 39 | 40 | 41 | 42 | 43 | 44 | 45 |
| 46 | 47 | 48 | 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 | 73 | 74 | 75 |
| 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 |
| 106 | 107 | 108 | 109 | 110 | 111 | 112 | 113 | 114 | 115 | 116 | 117 | 118 | 119 | 120 |
| 121 | 122 | 123 | 124 | 125 | 126 | 127 | 128 | 129 | 130 | 131 | 132 | 133 | 134 | 135 |
| 136 | 137 | 138 | 139 | 140 | 141 | 142 | 143 | 144 | 145 | 146 | 147 | 148 | 149 | 150 |
| 151 | 152 | 153 | 154 | 155 | 156 | 157 | 158 | 159 | 160 | 161 | 162 | 163 | 164 | 165 |
| 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 |
| 196 | 197 | 198 | 199 | 200 | 201 | 202 | 203 | 204 | 205 | 206 | 207 | 208 | 209 | 210 |
| 211 | 212 | 213 | 214 | 215 | 216 | 217 | 218 | 219 | 220 | 221 | 222 | 223 | 224 | 225 |

FIG. 1C

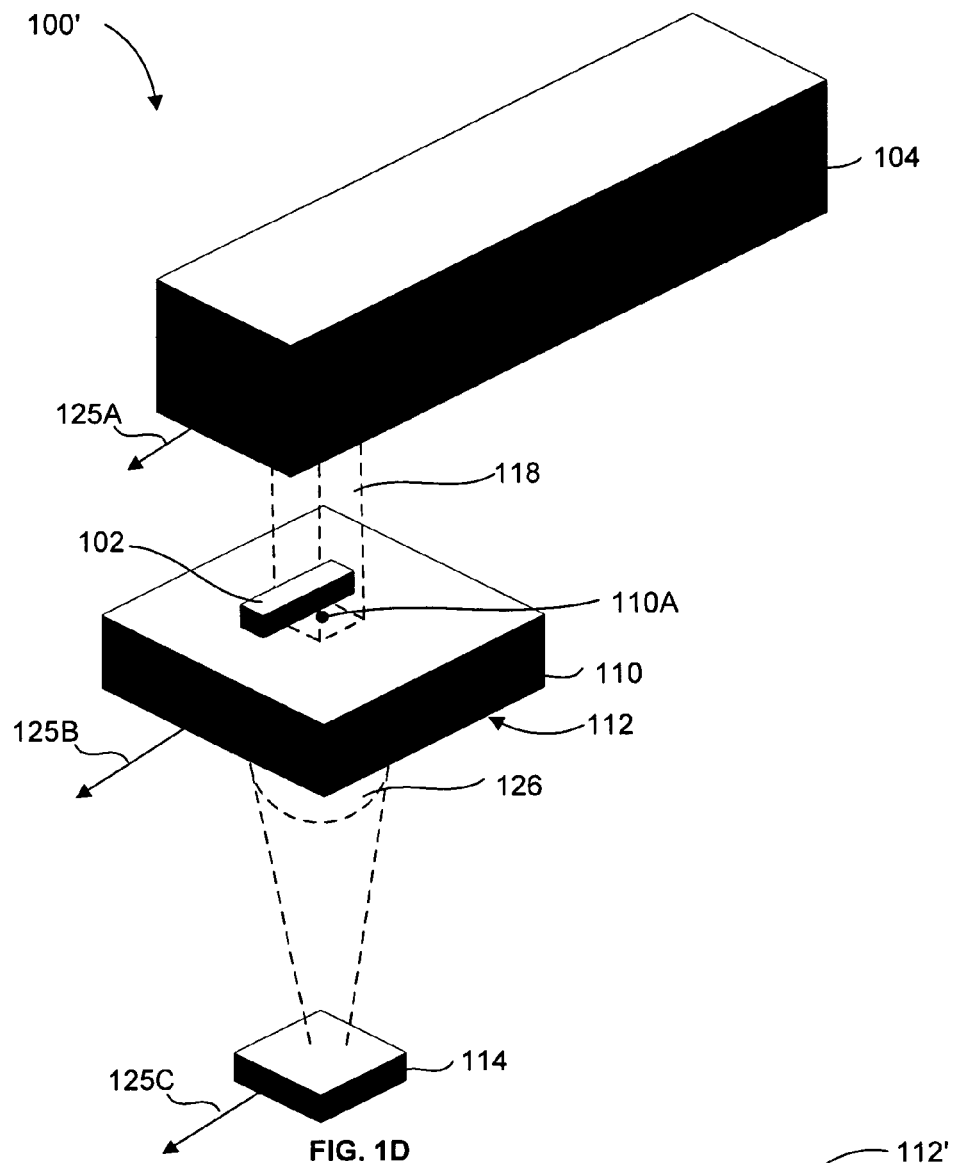
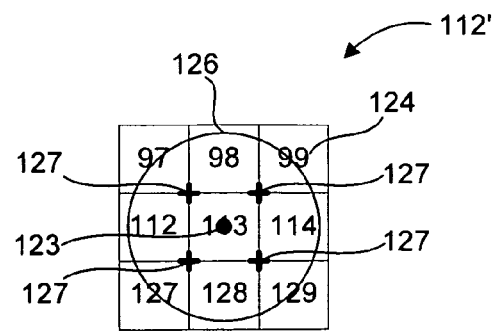
FIG. 1D
FIG. 1E

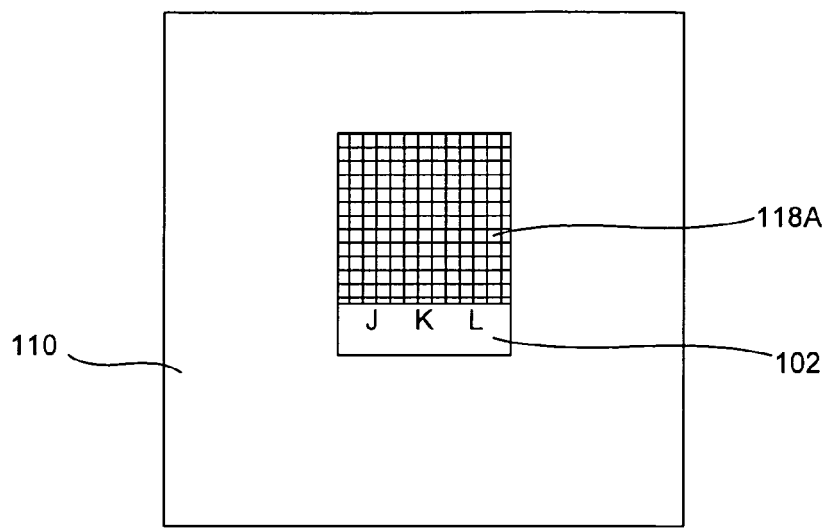
FIG. 3D
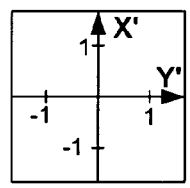
FIG. 3E
FIG. 3F
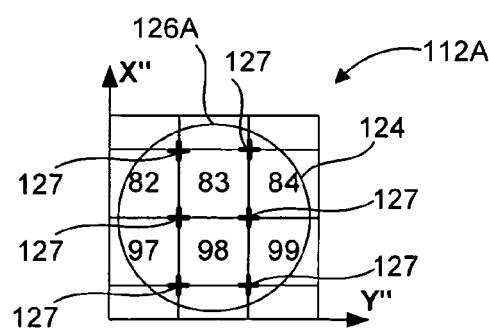
FIG. 3G
FIG. 3H

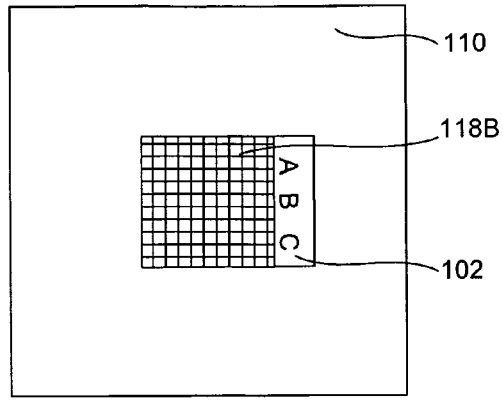
FIG. 3I
| (-1,1) J | (0,1) G | (1,1) D |
|---|---|---|
| (-1,0) K | (0,0) H | (1,0) E |
| (-1,-1) L | (0,-1) I | (1,-1) F |
FIG. 3J
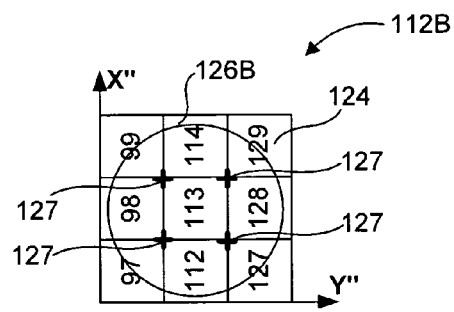
FIG. 3K
| (-1,1) D | (0,1) E | (1,1) F |
|---|---|---|
| (-1,0) G | (0,0) H | (1, 0) I |
| (-1,-1) J | (0,-1) K | (1,-1) L |
FIG. 3L
| (-1,2) A | (0,2) B | (1,2) C |
|---|---|---|
| (-1,1) D | (0,1) E | (1,1) F |
| (-1,-0) G | (0,0) H | (1, 0) I |
| (-1,-1) J | (0,-1) K | (1,-1) L |
FIG. 3M

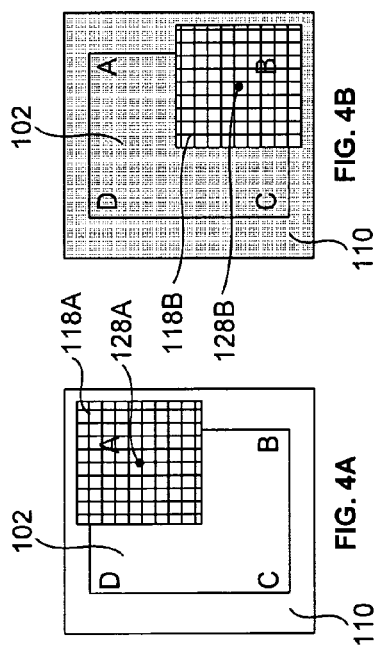
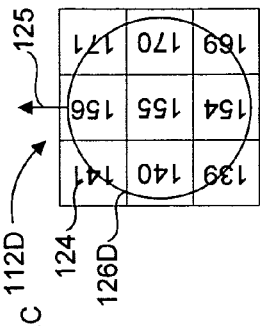
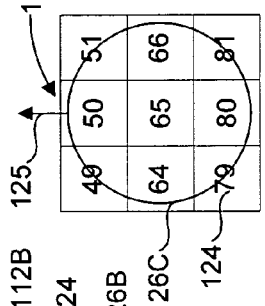
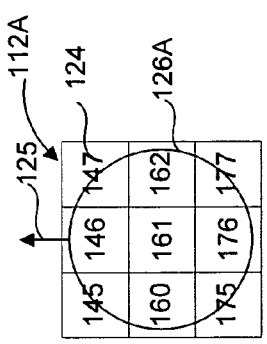

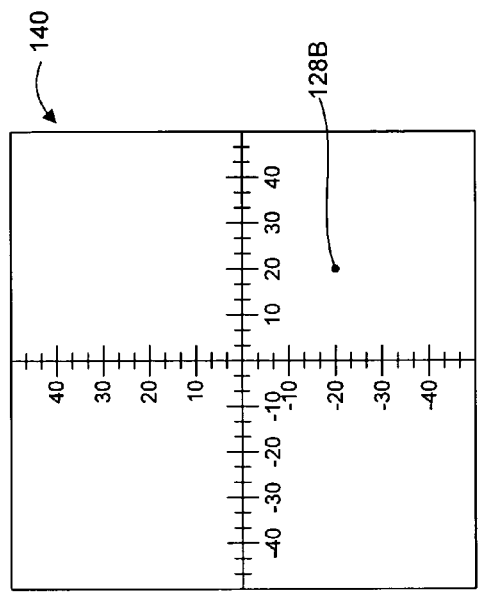
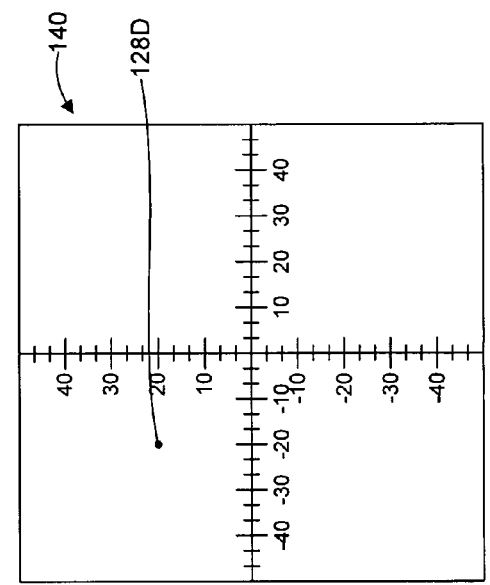
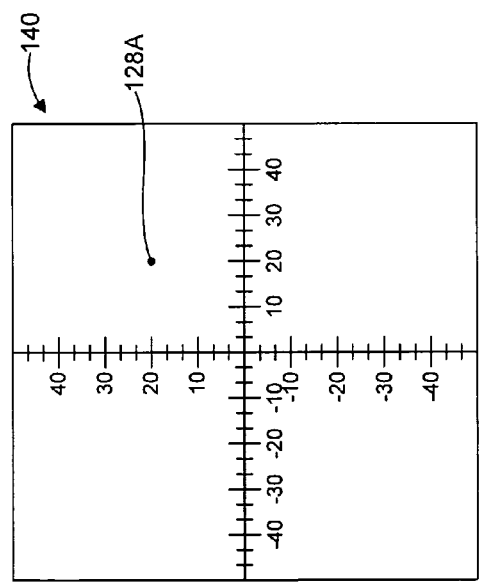
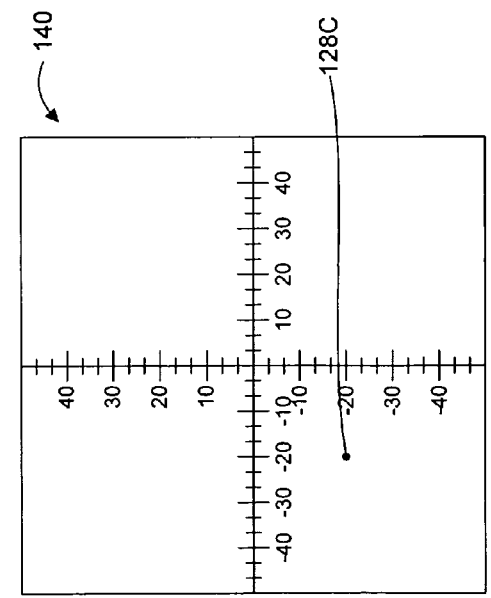

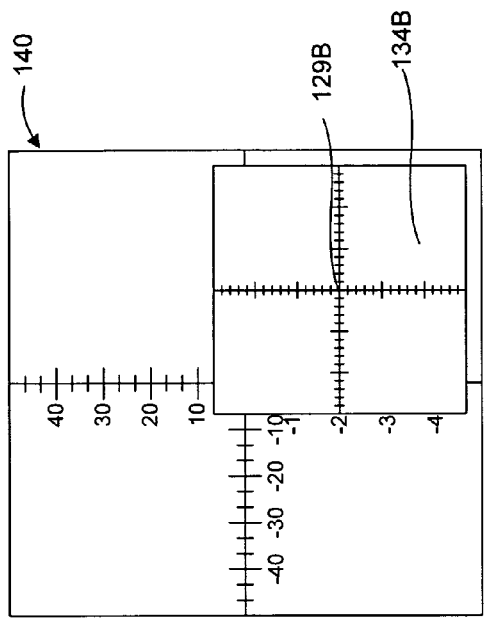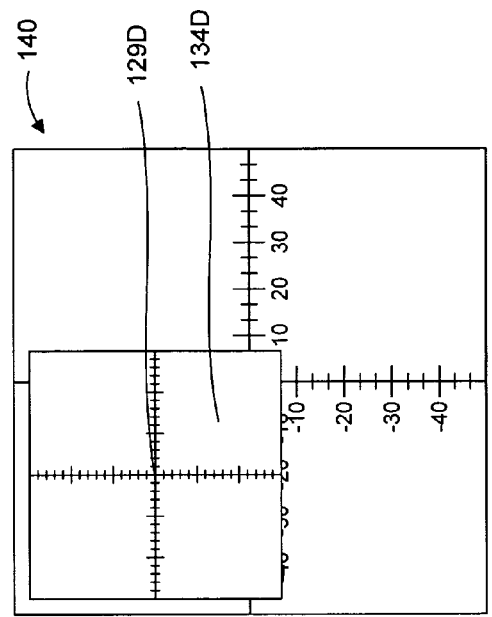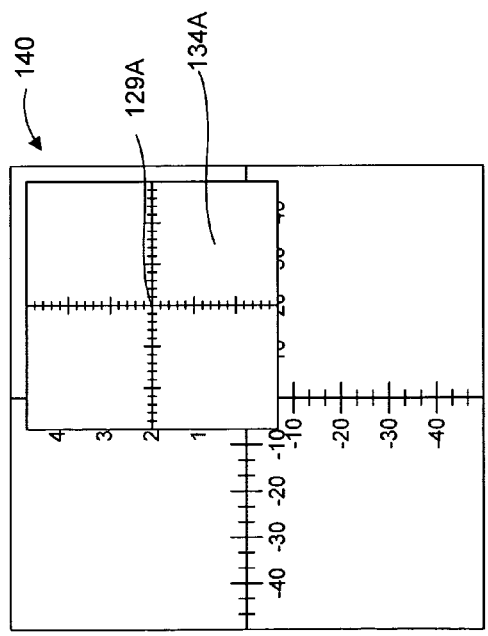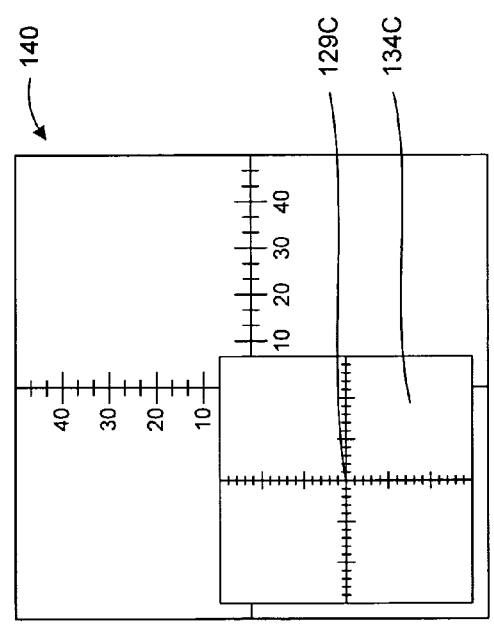

SYSTEM, APPARATUS, METHOD AND COMPUTER PROGRAM PRODUCT FOR OPTICAL POSITION RECOGNITION

BACKGROUND OF THE INVENTION

1. Field of the Invention

The present invention generally relates to optical position recognition, and more particularly to methods, systems, apparatuses, and computer program products for employing optical position recognition techniques to correlate frame data acquired during multiple measurements (i.e., captured representations, such as, e.g., images or scans) of an object for use in obtaining a three-dimensional representation of the object.

2. Related Art

In conventional three-dimensional measurement systems, such as those having a small field of view used to obtain images of relatively larger objects, for example dental structures such as actual or prosthetic teeth or dental molds or castings, the measuring field or the measuring volume of the optical measurement system is smaller than a volume of the object to be measured. Accordingly, it is necessary to perform multiple measurements of different portions of the object to acquire substantially complete representations for the object. The object is moved relative to the optical measurement system between measurements. The data acquired from each measurement must be correlated, i.e., mapped onto a common coordinate system, to obtain a composite three-dimensional representation of the entire object.

Conventional three-dimensional measurement systems may employ mechanical registration techniques to correlate data acquired during multiple measurements. FIG. 10A depicts an exemplary system 1000 that uses conventional mechanical registration techniques to correlate three-dimensional data acquired during multiple measurements. The system 1000 includes measuring optics 1002 and a slide 1004. A support member 1006 positions the measuring optics 1002 at a fixed orientation relative to the slide 1004, such that there is no relative movement between the measuring optics 1002 and the slide 1004. A mechanical grid 1008 is provided on an upper surface of the slide 1004. An object 1010 is secured to an object holder 1012. The object holder 1012 is positioned in predetermined locations on the mechanical grid 1008. A measurement is performed and a frame of three-dimensional data is acquired at each location. A composite three-dimensional representation of the entire object is created by combining the frame data according to well-known frame registration techniques. A disadvantage of the system 1000 is that the object holder 1012 can be placed only in predetermined locations that are accommodated by the mechanical grid 1008, which may not be optimal locations for acquiring three-dimensional data.

Conventional three-dimensional measurement systems also may employ optical registration techniques to correlate frame data from multiple measurements. Positions are determined by points of reference located on an object holder. A Cercon Eye Scanner from DeguDent GmbH employs optical registration techniques, for example.

FIG. 10B depicts an exemplary system 1050 that uses conventional optical registration techniques to correlate three-dimensional data acquired during multiple measurements. The system 1050 includes measuring optics 1052 and a slide 1054. A support member 1056 positions the measuring optics 1052 at a fixed orientation relative to the slide 1054, such that there is no relative movement between the measuring optics 1052 and the slide 1054. An object 1058 is secured to an object holder 1060. The object holder 1060 includes a reference position marker adjuster 1061 that positions a reference position marker 1062 above the object 1058. The object holder 1060 is then moved over the slide 1054 in discrete steps. A measurement is performed and a frame of three-dimensional data is acquired during each step. Each measurement must include the reference position markers 1062. Optical registration techniques are used to identify the reference position marker 1062 and generate corresponding positioning information for each frame of three-dimensional data. A composite three-dimensional representation of the entire object is created by combining the frame data according to well-known frame registration techniques.

The measuring optics 1052 typically include a camera (not illustrated) that is employed to observe the reference position marker 1062 on the object holder 1060. A disadvantage of the system 1050 is that the camera must be able to view the reference position marker 1062 during each measurement. The reference position marker 1062 must not be covered by the object 1058 or otherwise obscured from the camera while measurements are taken.

The present invention overcomes the above limitations associated with measuring a three-dimensional object using conventional frame registration techniques.

BRIEF DESCRIPTION OF THE INVENTION

The present invention meets the above-identified needs by providing methods, systems, apparatuses, and computer program products for evaluating an object disposed on an upper surface of an object holder. Various embodiments of the present invention advantageously enable measurement data acquired during multiple measurements of an object to be correlated and combined to form composite measurement data of the object.

In accordance with one example aspect of the present invention, there is provided a method of evaluating an object disposed on an upper surface of an object holder. At least one first frame representing a captured portion of the object is acquired, while the object holder is positioned at each of a plurality of locations. At least one second frame representing a captured portion of at least one other surface of the object holder is acquired, while the object holder is positioned at each of the plurality of locations, where the at least one other surface of the object holder is disposed in space lower than the upper surface of the object holder. At least one spatial characteristic associated with the captured portion of the object is determined based on at least one of the acquired frames.

The method also may include creating composite data based on the acquired frames. The composite data may form a three-dimensional representation of the object. Further, the method may include, for each second frame, determining an orientation and coordinates associated with the captured portion of the at least one other surface of the object holder, and for each first frame, translating coordinates associated with the captured portion of the object, based on the orientation and the coordinates determined for a corresponding second frame. The at least one other surface may be a lower surface of the object holder. In addition, the at least one other surface may include at least one optical marker, and the method may further include determining an orientation of at least one optical marker captured in each second frame, determining a value of the at least one optical marker captured in each second frame, and determining coordinates of a reference point associated with each second frame. Moreover, each first frame may include measurement data and each second frame may include image data.

An apparatus, system, and computer program product that operate in accordance with the method also are provided, according to other example aspects of the invention.

BRIEF DESCRIPTION OF THE DRAWINGS

The features and advantages of the present invention will become more apparent from the detailed description set forth below when taken in conjunction with the drawings, in which like reference numbers indicate identical or functionally similar elements.

FIG. 1C illustrates an example of an optical coding pattern of the system illustrated in FIG. 1A.

FIG. 1D is a perspective view of some components of the system illustrated in FIG. 1A.

FIG. 1E illustrates a portion of the optical coding pattern illustrated in FIG. 1C and a view area of a camera unit of the system illustrated in FIG. 1D.

FIGS. 3A-3M illustrate a first example of multiple measurements of an object using the system illustrated in FIG. 1A.

FIGS. 4A-4D illustrate a second example of multiple measurements of an object using the system illustrated in FIG. 1A.

FIGS. 5A-5D illustrate respective views of the optical coding pattern shown in FIG. 1C, obtained by the camera of the system illustrated in FIG. 1A, during each of the measurements illustrated in FIGS. 4A-4D.

FIGS. 7A-7D illustrate translation of coordinates from the coordinate system illustrated in FIGS. 6A-6D to a reference coordinate system.

FIGS. 8A-8D illustrate translation of coordinates associated with the measurement data acquired during each of the measurements illustrated in FIGS. 4A-4D to the reference coordinate system illustrated in FIGS. 7A-6D.

DETAILED DESCRIPTION

I. Overview

Example embodiments of the present invention relate to methods, systems, apparatuses, and computer program products for employing optical position recognition techniques to correlate measurement data acquired during multiple measurements of surfaces of an object, to be used to obtain a composite representation of the object, even though a field of view of a measuring unit may be smaller than the size of the object. Each is useful for obtaining composite representations of any type of object, although the present application is described in the context of a dental apparatus that obtains composite three-dimensional representations of actual or prosthetic teeth or dental molds or castings.

II. System

The following description is described in terms of an exemplary system in which an exemplary embodiment of the present invention is implemented. This is for illustrative purposes only and is not intended to limit the scope of the application of the present invention to the described example only. It will be apparent to one skilled in the relevant art(s) in view of this description how to implement the present invention in alternative embodiments.

Figure 1A:
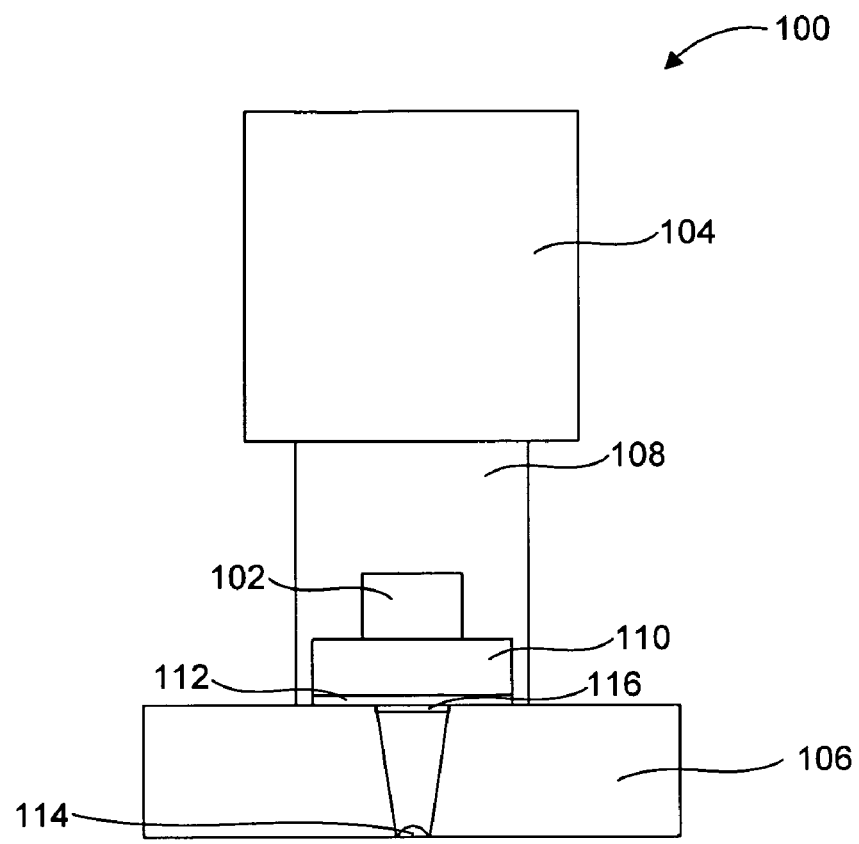
FIG. 1A illustrates a system according to an example embodiment of the present invention.

FIG. 1A illustrates a system 100 according to an exemplary embodiment of the present invention. The system 100 enables images to be captured that can be used to form a three-dimensional representation of an object 102, such as a tooth or other object. The system 100 includes a measuring unit 104 and a slide 106. A support member 108 positions the measuring unit 104 at a fixed orientation relative to the slide 106, such that there is no relative movement between the measuring unit 104 and the slide 106.

The measuring unit 104 may be comprised of any suitable conventional or later developed three-dimensional measuring unit. For example, the measuring unit 104 may include a fringe-projection system, which consists of a fringe pattern projector and a camera. However, the measuring unit 104 that can be used with the present invention is not limited to a fringe-projection unit. Other types of three-dimensional measuring units may be used, e.g., the measuring unit 104 may employ confocal laser scanning microscopy, optical coherence tomography, white light interferometry, or other techniques known in the art. For example, col. 4, line 51, through col. 7, line 61, of U.S. Pat. No. 4,837,732 (Brandestini et al.) and col. 4, line 15, through col. 14, line 48, of U.S. Pat. No. 6,885,464 (Pfeiffer et al.) disclose systems suitable for use in the measuring unit 104. Those patents are incorporated by reference herein in their entireties, as fully set fourth herein.

The object 102 to be measured is placed on or secured to an object holder 110, which has an optical coding pattern 112 securely attached at a lower portion thereof. Of course, the optical coding pattern 112 could be integrally formed with the lower portion of the object holder 110 without departing from the scope of the present invention. A camera unit 114 is disposed within the slide 106, or, in other embodiments, beneath the slide 106 so long as the optical coding pattern 112 is within the field of view of the camera unit 114. A transparent portion 116 is provided on an upper surface of the slide 106. The transparent portion 116 enables the camera unit 114 to view at least a portion of the optical coding pattern 112 to acquire image data representing that portion, which data is processed to determine spatial characteristics of the optical coding pattern 112, such as an orientation and a relative position of the optical coding pattern 112 with respect to the camera unit 114. Spatial characteristics of the optical coding pattern 112 are used to determine corresponding spatial characteristics of the object holder 110, such as an orientation and a relative position of the object holder 110 with respect to the measuring unit 104, as described below.

Figure 1B:
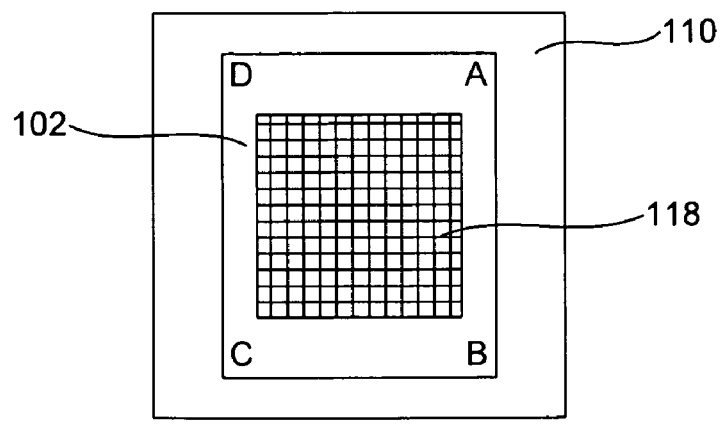
FIG. 1B illustrates a measurement area of the system illustrated in FIG. 1A.

FIG. 1B illustrates the object 102 and the object holder 110 depicted in FIG. 1A, as viewed from a perspective looking down on those components. The object 102 includes an upper-right portion A, a lower-right portion B, a lower-left portion C, and an upper-left portion D. The measuring unit 104 acquires measurement data in a measuring field 118 of the measuring unit 104. The terms "measuring field," "field of view," "measuring area," and "measuring volume" may be used interchangeably herein. Since the measuring field 118 can be smaller than the object 102, multiple measurements can be performed to acquire measurement data for the object 102, for use in obtaining a three-dimensional representation thereof, according to an aspect of the invention.

FIG. 1C illustrates an exemplary optical coding pattern 112 of the present invention. The optical coding pattern 112 includes a plurality of horizontal line segments 120 and a plurality of vertical line segments 122, which form a grid pattern. The optical coding pattern 112 also includes a plurality of optical markers 124 that are used to identify predetermined locations on the optical coding pattern 112, such as the intersections of the horizontal line segments 120 and vertical line segments 122.

In the illustrated example, the optical markers 124 of the exemplary optical coding pattern 112 are numbers that range from 1-225, however, other types of optical markers 124 can be used. For example, the optical markers 124 may include a plurality of unique bar codes, and/or a plurality of circles each having a different radius. Other codes or symbols that uniquely identify a plurality of locations on the optical coding pattern 112 also may be used.

FIG. 1D illustrates a portion 100' of the system 100 illustrated in FIG. 1A, such as measuring unit 104, object holder 110, optical coding pattern 112, camera unit 114, and measuring field 118. As represented in the example shown in FIG. 1D, the measuring unit 104 acquires measurement data of an object 102 in the measuring field 118 (within the field of view) of the measuring unit 104. The camera unit 114 acquires image data corresponding to an optical coding pattern 112, which is formed on a lower surface of the object holder 110. The camera unit 114 can be any camera that is capable of taking a two-dimensional image of the optical coding pattern 112. The camera unit 114 acquires image data corresponding to a view area 126.

For illustrative purposes, the object holder 110 in the present example is deemed to be positioned such that a center of the measuring field 118 is aligned with a center of the object holder 110, which is aligned with a center of the view area 126 of the camera unit 114. The center of the object holder 110 is indicated by reference number 110A. In the present example, when the object holder is positioned as shown in FIG. 1D, a pixel 123 corresponding to the center of the view area 126 of the camera unit 114 is aligned with the center of the "113" optical marker of the optical coding pattern 112', as shown in FIG. 1E. The "113" optical markers 124 corresponds to a center optical marker 124 of the optical coding pattern 112, as shown in FIG. 1C.

In the example shown in FIG. 1D, the center of the measuring field 118 is aligned with the center pixel 123 of the view area 126 of the camera unit 114. In other embodiments, however, the center of the measuring field 118 may be offset from the center of the view area 126 of the camera unit 114 by a fixed amount, which is taken into account when translating coordinates (to be described below) representing a portion of the optical coding pattern 112 in a center of the view area 126 of the camera unit 114 to corresponding coordinates of a center of the measuring field 118 in a reference coordinate system of the object holder 110.

Also shown in FIG. 1D are arrows or axes labeled 125A, 125B, and 125C indicating reference orientations for coordinate systems of the measuring unit 104, the optical coding pattern 112, and the camera unit 114, respectively.

III. Process

Figure 2:
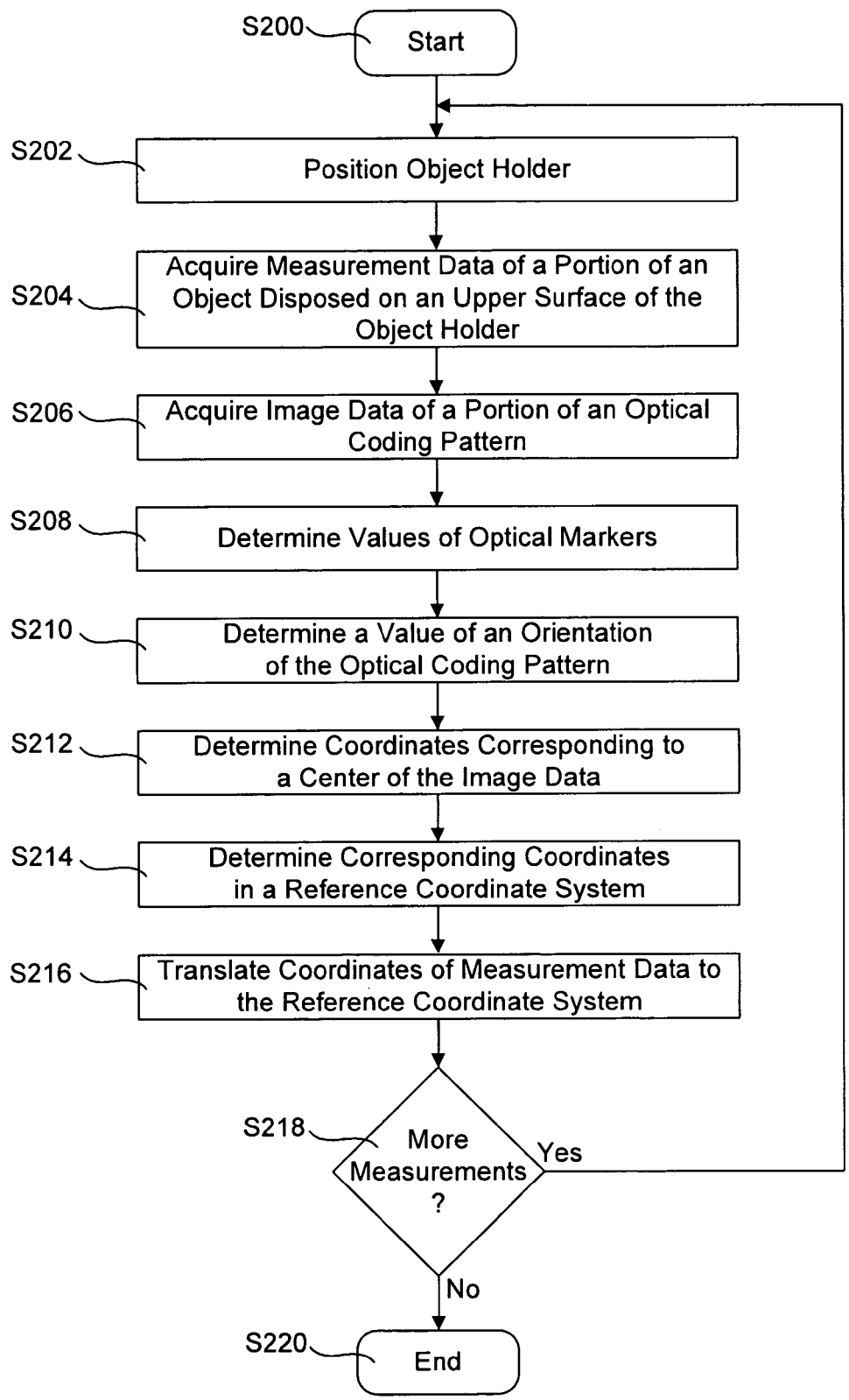
FIG. 2 illustrates an exemplary process for acquiring and correlating three-dimensional data using the system illustrated in FIG. 1A.

FIG. 2 illustrates an exemplary process, according to an aspect of the invention, for obtaining images of, and spatial characteristics (e.g., spatial coordinates and orientations) associated with, an object (e.g., one or more teeth), for use in obtaining a three-dimensional representation thereof. The process can be performed by an optical position recognition system, such as the systems illustrated in FIGS. 1A and 8, for example. Referring to FIG. 2 in conjunction with FIGS. 1A through 1E, the process begins in Step S200. Initially, the object 102 is placed on or secured to an upper surface of the object holder 110.

In Step S202, the object holder 110 is positioned at a selected location on the slide 106. In Step S204, the measuring unit 104 acquires measurement data in the measuring field 118 in which a portion of the object 102 appears (i.e., the measuring unit 104 captures an image frame of that portion).

In Step S206, the camera unit 114 acquires image data of at least a portion of the optical coding pattern 112 in the field of view (view area) 126 of the camera unit 114 (i.e., the camera unit 114 obtains or captures a digitized scan or image frame of that portion of the optical coding pattern 112). That is, the camera unit 114 acquires image data corresponding to a portion of the optical coding pattern 112 that is disposed over and faces the transparent portion 116 of the slide 106. In a preferred embodiment, Step S204 and Step S206 occur simultaneously for each position of the object holder; although in other embodiments they need not be, in which case the steps are correlated for each such position.

In Step S208, the processor of the system 100 uses a software module to process the image data obtained in Step S206 to determine values of one or more of the captured optical markers 124, which values are used in a manner to be described below (e.g., Step S212) to identify one or more intersections of line segments surrounding or adjacent to at least one of the captured optical markers 124. For example, in a case where the optical markers 124 are numbers, conventional optical character recognition (OCR) software may be used to determine a value of a captured optical marker 124. In a case where the optical markers 124 are barcodes, conventional bar code reading software may be used to determine a value of a captured optical marker 124. In a case where the optical markers 124 are circles each having a different radius, a software module may be used to determine values of a captured optical marker 124.

In Step S210, a processor (e.g., processor 906 of FIG. 9 to be described below) of the system 100 uses a software module to process the image data obtained in Step S206 to determine a value representing a spatial characteristic (i.e., an orientation) of the optical coding pattern 112 with respect to a reference orientation (e.g., 125B). In some embodiments, the software module is used to determine an orientation of one or more of the optical markers 124 to determine the orientation of the optical coding pattern 112.

For example, in a case where the optical markers 124 are circles each having a different radius, the software module may use the values of at least two captured optical markers 124 to determine the orientation of the optical coding pattern 112. This is because in some cases it can be more accurate to determine an orientation based on more than a single symmetrical marker, such as circle. In an example embodiment, the software module may make the determination based on an orientation of one or more line segments that intersect the centers of two identified circular optical markers 124.

Also, in some example embodiments, in Step S210 the software module is used to determine an orientation of one or more of the optical markers 124 and an orientation of one or more of the horizontal line segments 120 and/or the vertical line segments 122 to determine an orientation of the optical coding pattern 112 with respect to a reference orientation. The manner in which orientations are determined for one or more line segments, such as, e.g., segments 120 and/or 122, one or more optical markers 124, and the optical coding pattern 112, can be according to any suitable technique used to determine orientations of objects.

Location information representing coordinates of predetermined locations of each intersection of the horizontal line segments 120 and the vertical line segments 122 of the optical coding pattern 112 is stored in a memory unit (e.g., secondary memory 910 of FIG. 9 to be described below) of the system 100. The location information may be derived from calibration measurements or may be deduced from a specification for the optical coding pattern 112. In an example embodiment, the location information is stored in the memory unit prior to acquiring measurement data (e.g., Step S204) and is used to correlate measurement data acquired during multiple scans of an object.

In Step S212, the processor of the system 100 uses a software module to determine spatial characteristics such as coordinates that correspond to a center of the portion of the optical coding pattern 112 captured in the view area 126 of the camera unit 114. In one example embodiment, the software module makes this determination based on at least one of (a) particular intersections of the optical coding pattern 112 that are observed in the view area 126 of the camera unit 114, (b) location information associated with the observed intersections, (c) the values of the optical markers 124 determined in Step S208, and (d) the orientation of the optical coding pattern 112 determined in Step S210.

For example, in one case Step S212 can be performed by identifying one of the intersections surrounding or adjacent to an observed optical marker 124, retrieving coordinates (of the location information) corresponding to the identified intersection, and, based on these coordinates and the orientation of the optical coding pattern 112 obtained in Step S210, performing linear interpolation in a known manner to determine coordinates corresponding to a center of the portion of the optical coding pattern 112 captured in the view area 126 of the camera unit 114.

In Step S214, the processor of the system 100 uses a software module to translate coordinates associated with the center of the portion of the optical coding pattern 112 captured in the view area 126 of the camera unit 114 (as determined in Step S212) to corresponding coordinates of a center of the measuring field 118, in the coordinate system of the upper surface of the object holder 110.

Figure 6A:
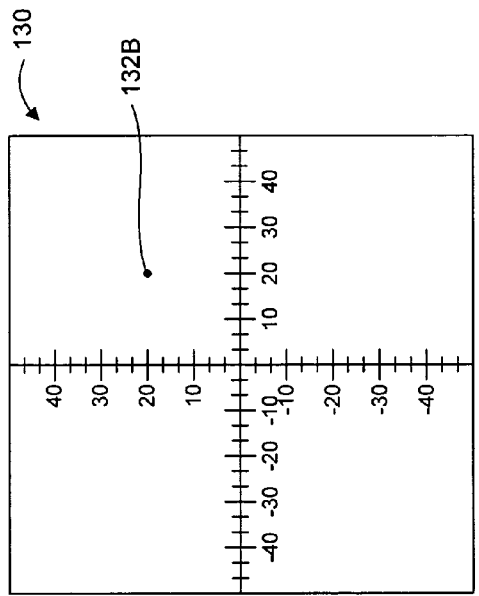
FIGS. 6A-6D illustrate coordinates in a coordinate system of the optical coding pattern illustrated in FIG. 1C, resulting from the measuring of the object illustrated in FIGS. 4A-4D.

As an example of a coordinate in one coordinate system converted to another system, FIG. 6A shows a coordinate of (20,−20) in a coordinate system 130 of the optical coding pattern 112, and 7A shows a coordinate of (20,20) converted into a reference coordinate system 140 of the upper surface of the object holder 110. The correspondence between coordinates in the coordinate system 130 of the optical coding pattern 112 and the reference coordinate system 140 of the upper surface of the object holder 110 depends on a predefined relationship between the two systems. Further, the correspondence between coordinates associated with the center of the portion of the optical coding pattern 112 captured in the view area 126 of the camera unit 114 and the coordinates of the center of the measuring field 118 of the measuring unit 104 depends on the physical arrangement of the measuring unit 104 with respect to the camera unit 114, and thus Step S214 can take into account that relationship as well.

In Step S216, the processor of the system 100 uses a software module to perform a translation of information obtained in Step S210 and a translation of spatial characteristics, such as coordinates associated with each datum of the measurement data acquired in Step S204, in a manner to be described below. Those coordinates may have been determined prior to Step S216, such as in Step S204, for example, or may be determined at the outset of Step S216. Those coordinates are in a coordinate system of the measuring unit 104.

Referring to Step S216, in that step the software module translates the orientation of the optical coding pattern 112 in the coordinate system of the optical coding pattern 112, determined in Step S210, to a corresponding orientation of the object holder 110 in the reference coordinate of the upper surface of the object holder 110. In other words, based on a predetermined mathematical algorithm defining a relationship between the two coordinate systems, the orientation in the coordinate system of the optical coding pattern 112 is "mapped" to a corresponding orientation in the reference coordinate system of the upper surface of the object holder 110. The software module then translates, using a mathematical transformation, coordinates associated with each datum of the measurement data acquired in Step S204 from the coordinate system of the measuring unit 104 to the reference coordinate system of the upper surface of the object holder 110. In this manner, despite where the object holder 110 is orientated when measurement data is taken, the acquired data may be placed in a reference orientation.

The translations performed in Steps S214 and S216 can be performed using any suitable translation algorithms operable according to this description, as would be readily appreciated by one skilled in the art in view of this description.

In Step S218, a determination is made whether more measurements are to be performed (e.g., whether additional measurements need to be performed to capture other desired parts of the object 102). If more measurements are to be performed ("Yes" at Step S218), Step S202 is repeated so that the object holder 110 is moved to another selected location on the slide 106, and Steps S204 through S218 are repeated for that location as described above. If no more measurements are to be performed ("No" at Step S218), the process ends in Step S220. All frames of measurement data have translated coordinates that are correlated in the reference coordinate system.

Accordingly, an aggregation of the frames of measurement data can be formed, using obtained spatial characteristics, such as coordinates, to provide composite measurement data for the object 102. As such, Step S220 can include combining the measurement data obtained in Step S204 based on the translated coordinates obtained in Step S216, to provide a composite three-dimensional representation of the captured parts of the object 102. This formation of the composite representation may be performed according to any suitable frame registration techniques, such as, e.g., an Iterative Closest Point (ICP) algorithm. However, in principle, no frame registration is needed, as the information from the camera unit 114 is sufficient to create a composite three-dimensional representation of the captured parts of the object 102.

IV. Exemplary Measuring Operations

First Example

Figure 3A:
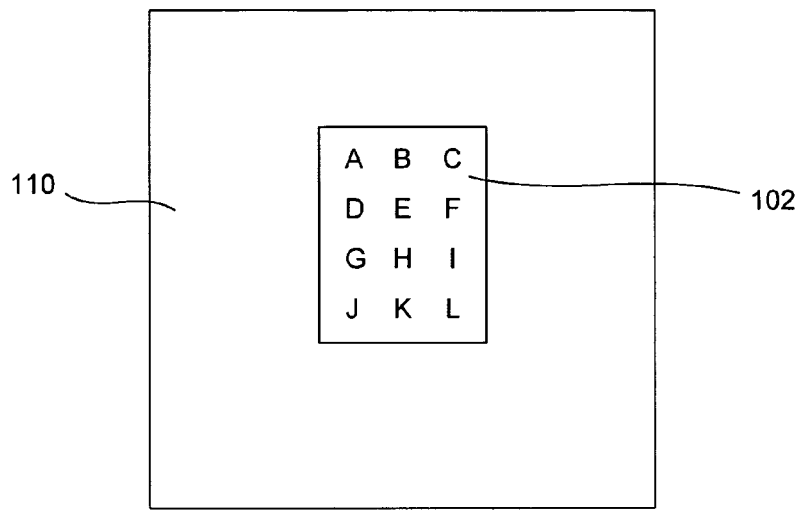

FIGS. 3A-3J illustrate a first example of how the system 100 of FIG. 1A correlates acquired measurement data (e.g., Steps S206 through S216 of FIG. 2) for the object 102 according to an exemplary embodiment of the present invention. Initially, the object 102 is secured to the object holder 110, for example, with an adhesive. As shown in FIG. 3A, the object 102 includes portions identified for illustrative purposes as portions A through L.

Figure 3B:
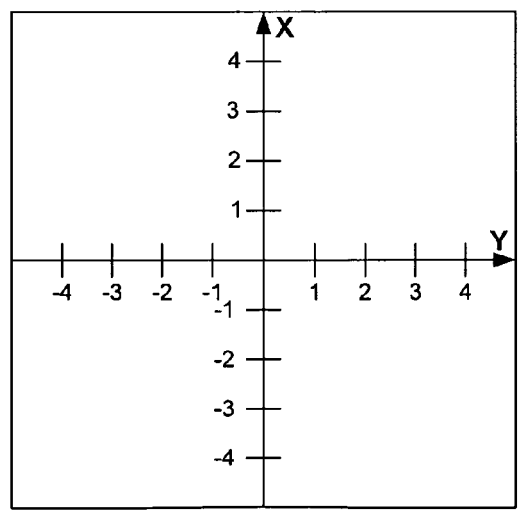
Figure 3C:
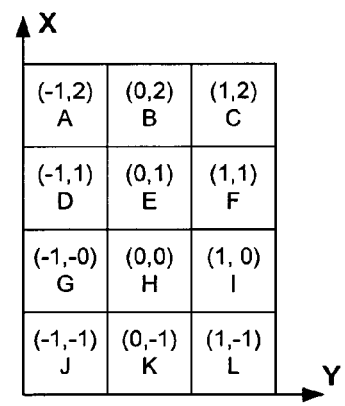

An exemplary object holder 110 has a square-shaped cross-sectional area, with each side of the square having a length of 10 centimeters (cm). A reference coordinate system (X,Y) of the upper surface of the object holder 110 has an origin corresponding to a center of the square, as shown in FIG. 3B. The coordinates of the reference coordinate system (X,Y) are spaced in 1 cm increments. Accordingly, each quadrant of the reference coordinate system (X,Y) is a 5 cm by 5 cm square, and coordinates within each quadrant range in magnitude between zero and 5 cm, as shown in FIG. 3B. FIG. 3C depicts a representation of portions A through L of the object 102 and associated coordinates in the reference coordinate system (X,Y).

First Example: Upper Portion

As shown in FIG. 3D, the object holder 110 is positioned so that the measuring unit 104 (not shown in FIG. 3D) acquires measurement data (e.g., Step S204 in FIG. 2) in a measuring field 118A that includes an upper portion of the object 102. FIG. 3E illustrates a coordinate system (X',Y') of the measuring unit 104 (not shown in FIG. 3E). The origin of the coordinate system (X',Y') of the measuring unit 104 corresponds to the center of the measuring field 118A. FIG. 3F depicts a representation of measurement data corresponding to portions A through I of the object 102, and associated coordinates in the coordinate system (X',Y') of the measuring unit 104.

FIG. 3G illustrates a portion 112A of the optical coding pattern 112 and a corresponding view area 126A of the camera unit 114 (not shown in FIG. 3G), when the object holder 110 is positioned as shown in FIG. 3D. As represented in FIG. 3G, the camera view area 126A is centered between the "83" and "98" optical markers 124 in a coordinate system (X",Y") of the optical coding pattern 112, when the object holder 110 is positioned as shown in FIG. 3D. This relationship can be appreciated further in view of FIGS. 1A, 1C, and 1D. The optical coding pattern 112 shown in FIG. 1C is positioned beneath the object holder 110 facing down towards the camera unit 114. In one example, the optical coding pattern 112 is oriented such that the upper-most row (including the values "1" to "15" among the optical marker 124 shown in FIG. 1C) is positioned away from the support member 108 and so that the lower-most row (including the values "211" to "225" among the optical markers 124 shown in FIG. 1C) is positioned closest to the support member 108.

As shown in FIG. 3G, the camera unit 114 (not shown) can envision, in the view area 126A, six intersections 127 of line segments and six optical markers 124 (e.g., Step S206 in FIG. 2). The processor uses a software module to determine at least one value of at least one of the optical markers 124 (e.g. Step S208 of FIG. 2). The processor also uses a software module to determine an orientation of at least one of the optical markers 124, which is used to determine an orientation of the optical coding pattern 112 (e.g. Step S210 of FIG. 2).

In addition, the processor uses a software module to retrieve coordinates associated with at least one of the intersections 127 of line segments from a memory unit (e.g., secondary memory 910 of FIG. 9 to be described below), which the processor uses to determine coordinates, in the coordinate system (X",Y") of the optical coding pattern 112, of a location of a portion 112A of the optical coding pattern 112 that corresponds to the center of the view area 126A (e.g. Step S212 of FIG. 2).

The processor employs a software module to transform the orientation of the optical coding pattern 112 determined in Step S210 into a corresponding orientation of the object holder 110 and to transform the coordinates of the center of the view area 126A (determined in Step S212) into corresponding coordinates of the center of the measuring field 118A, in the reference coordinate system (X,Y) of the upper surface of the object holder 110 (e.g. Step S214 of FIG. 2). In addition, the processor employs a software module to generate a transformation that is used to translate coordinates associated with the measurement data from the coordinate system (X',Y') of the measuring unit 104 to corresponding coordinates in the reference coordinate system (X,Y) of the upper surface of the object holder 110 (e.g. Step S216 of FIG. 2). FIG. 3H depicts a representation of the measurement data corresponding to portions A through I of the object 102 and associated coordinates, which have been translated to the reference coordinate system (X,Y) of the upper surface of the object holder 10.

First Example: Lower Portion

Next, as shown in FIG. 3I, the object holder 110 is positioned so that the measuring unit 104 (not shown in FIG. 3I) acquires measurement data (e.g., Step S204 in FIG. 2) in a measuring field 118B that includes a lower portion of the object 102. As shown in FIG. 3I, the object holder 110 has been rotated by ninety degrees from the orientation shown in FIG. 3D. A representation of measurement data corresponding to portions D through L of the object 102 and associated coordinates in the coordinate system (X',Y') of the measuring unit 104 are depicted in FIG. 3J.

FIG. 3K illustrates a portion 112B of the optical coding pattern 112 and a corresponding view area 126B of the camera unit 114 (not shown in FIG. 3K), when the object holder 110 is positioned as shown in FIG. 3I. The camera unit 114 (not shown in FIG. 3K) can envision, in the view area 126B, four intersections 127 of line segments and five optical markers 124 (e.g., Step S206 in FIG. 2). The processor uses a software module to determine values of at least one of the optical markers 124 (e.g. Step S208 of FIG. 2). The processor also uses a software module to determine an orientation of at least one of the optical markers 124 (e.g., the "113" optical marker 124), which is used as an orientation of the optical coding pattern 112 (e.g. Step S210 of FIG. 2).

In addition, the processor uses a software module to retrieve coordinates associated with at least one of the intersections 127 of line segments around the "113" optical marker 124 from a memory unit (e.g., secondary memory 910 of FIG. 9 to be described below), which the processor uses to determine coordinates associated with the center of the view area 126B, in the coordinate system (X",Y") of the optical coding pattern 112 (e.g. Step S212 of FIG. 2).

The processor employs a software module that uses the orientation of the optical coding pattern 112 determined in Step S210 and coordinates of the center of the view area 126A determined in Step S212 to determine a corresponding orientation of the object holder 110 and corresponding coordinates of the center of the measuring field 118B in the coordinate system (X,Y) of the upper surface of the object holder 110 (e.g. Step S214 of FIG. 2).

The processor employs a software module that uses the orientation of the object holder 110 and coordinates of the center of the measuring field 118B determined in Step S214 to generate a transformation that is used to translate coordinates associated with each datum of the measurement data acquired by the measuring unit 104 from the local coordinate system (X',Y') of the measuring unit 104 to corresponding coordinates in the reference coordinate system (X,Y) of the upper surface of the object holder 110 (e.g. Step S216 of FIG. 2).

FIG. 3L depicts a representation of the measurement data corresponding to portions D through L of the object 102 and associated coordinates, which have been translated from the coordinate system (X',Y') of the measuring unit 104 to the reference coordinate system (X,Y) of the upper surface of the object holder 110. As shown in FIG. 3L, the coordinates associated with portions D through L of the object 102 have been translated to account for the rotation of the optical coding pattern 112 shown in FIG. 3I.

Measurement data has been acquired for the upper and lower portions of the object 102. The processor uses a software module to combine the measurement data of the upper and lower portions of the object 102 to form composite measurement data for the object 102. FIG. 3M depicts a representation of composite measurement data corresponding to portions A through L of the object 102 and associated coordinates, which have been translated to the reference coordinate system (X,Y) of the upper surface of the object holder 110.

Second Example

FIGS. 4A-8E illustrate a second example of how the system 100 of FIG. 1A correlates acquired three-dimensional data (e.g., Steps S206 through S216 of FIG. 2) for an object 102 according to an exemplary embodiment of the present invention. Initially, the object 102 is secured to the object holder 110, for example, with an adhesive.

An exemplary object holder 110 has a square-shaped cross-sectional area, with each side of the square having a length of 10 cm. A reference coordinate system 140 has an origin corresponding to a center of the square. The coordinates of the reference coordinate system are spaced in 1 millimeter (mm) increments. Accordingly, each quadrant of the reference coordinate system is a 5 cm by 5 cm square, and coordinates within each quadrant range in magnitude between zero and 50 mm (5 cm), as shown in FIGS. 7A-7D.

Second Example: Upper-Right Portion A

The object holder 110 is positioned so that the measuring unit 104 acquires measurement data in a measuring field 118A that includes the upper-right portion A of the object 102, as shown in FIG. 4A. FIG. 5A illustrates a portion 112A of the optical coding pattern 112 and a corresponding view area 126A of the camera unit 114, when the object holder 110 is positioned as shown in FIG. 4A.

The processor of the system 100 uses a software module to process image data acquired by the camera unit 114, corresponding to a camera view area 126A (FIG. 5A), to determine at least one value of at least one of the optical markers 124 in the camera view area 126A, as described above with respect to Step S208. The processor uses the value(s) of the optical markers 124 in the camera view area 126A to identify an intersection in the vicinity of the optical markers 124. The processor retrieves coordinates associated with the intersection and determines a location (indicated by reference numeral 132A in FIG. 6A) and associated coordinates that correspond to a center of the view area or of the taken image 126A, as described above with respect to Step S212.

In addition, the processor of the system 100 uses a software module to process the image data acquired by the camera unit 114 to determine an orientation of at least one of the captured optical markers 124 with respect to the reference orientation indicated by arrow 125 in FIG. 5A (e.g., Step S210 of FIG. 2). In the illustrated example, the orientation of the optical markers 124 shown in FIG. 5A with respect to the reference orientation indicated by arrow 125 is zero degrees, since the optical markers 124 are not rotationally offset from the arrow 125.

FIG. 6A illustrates a representation of a coordinate system 130 of the optical coding pattern 112. In this example, the coordinates of the location indicated by reference numeral 132A in FIG. 6A represent the center of the camera view area 126A, and are determined to be (20,−20). The processor uses a software module to translate the coordinates of the location indicated by reference numeral 132A to a corresponding location in a reference coordinate system 140 of the upper surface of the object holder 110, which is represented by reference numeral 128A in FIG. 7A (e.g., Step S214). Coordinates associated with the location indicated by reference numeral 128A are determined to be (20,20), as shown in FIG. 7A.

The processor translates coordinates associated with each datum of the measurement data 134A (FIG. 8A), which was acquired in the measuring field 118A of FIG. 4A, to corresponding coordinates in the reference coordinate system 140 of the upper surface of the object holder 110 (e.g., Step S216). For example, coordinates associated with the center of the three-dimensional data 134A, which is indicated by reference number 129A in FIG. 8A, are translated to correspond with the coordinates of the location of the center of the measuring field 118A indicated by reference numeral 128A in FIG. 7A.

Second Example: Lower-Right Portion B

Next, the object holder 110 is positioned so that the measuring unit 104 acquires measurement data in a measuring field 118B that includes the lower-right portion B of the object 102, as shown in FIG. 4B. FIG. 5B illustrates a portion 112B of the optical coding pattern 112 and a corresponding camera view area 126B of the camera unit 114, when the object holder is positioned as shown in FIG. 4B.

The processor of the system 100 uses a software module to process image data acquired by the camera unit 114, corresponding to a camera view area 126B (FIG. 5B), to determine at least one value of at least one of the optical markers 124 in the camera view area 126B, as described above with respect to Step S208. The processor uses the value(s) of the optical markers 124 in the camera view area 126B to determine a location (indicated by reference numeral 132B in FIG. 6B) and associated coordinates that correspond to a center of the camera view area 126B, as described above with respect to Step S212.

In addition, the processor of the system 100 uses a software module to process the image data acquired by the camera unit 114 to determine an orientation of the optical markers 124 with respect to the reference orientation indicated by arrow 125 in FIG. 5B (e.g., Step S210 of FIG. 2). In the illustrated example, the orientation of the optical markers 124 shown in FIG. 5B with respect to the reference orientation indicated by arrow 125 is zero degrees, since the optical markers 124 are aligned with the reference orientation indicated by arrow 125 in FIG. 5B.

Figure 6B:
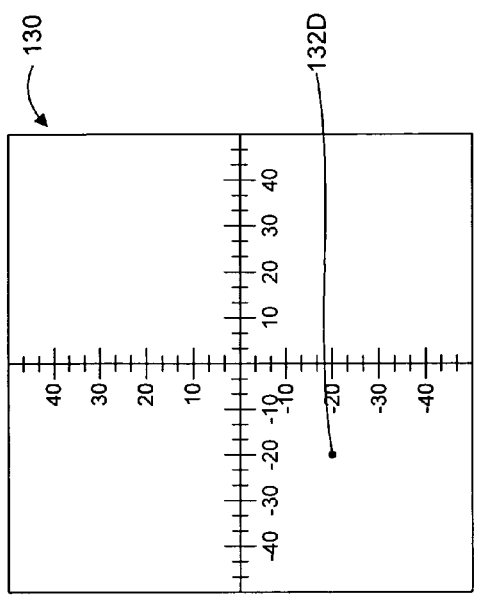

FIG. 6B illustrates a representation of the coordinate system 130 of the optical coding pattern 112. In this example, the center of the camera view area 126B is indicated by reference numeral 132B in FIG. 6B and has coordinates that are determined to be (20,20). The processor translates the coordinates associated with the center of the camera view area 126B to a corresponding location in the reference coordinate system 140 of the upper surface of the object holder 110. The corresponding location indicated by reference numeral 128B has coordinates that are determined to be (20,−20), as shown in FIG. 7B.

The processor uses a software module to translate coordinates associated with the three-dimensional data 134B (FIG. 8B), which was acquired in the measuring field 118B of FIG. 4B, to corresponding coordinates in the reference coordinate system 140 of the upper surface of the object holder 110 (e.g., Step S216). For example, coordinates associated with the center of the three-dimensional data 134B, which is indicated by reference number 129B in FIG. 8B, are translated to correspond with the coordinates of the location of the center of the measuring field 118B indicated by reference numeral 128B in FIG. 7B.

Second Example: Lower-Right Portion C

Next, the object holder 110 is positioned so that the measuring unit 104 acquires measurement data in a measuring field 118C that includes the lower-left portion C of the object 102, as shown in FIG. 4C. FIG. 5C illustrates a portion 112C of the optical coding pattern 112 and a camera view area 126C of the camera unit 114, when the object holder is positioned as shown in FIG. 4C.

The processor of the system 100 uses a software module to process image data acquired by the camera unit 114, corresponding to a camera view area 126C, to determine at least one value of at least one of the optical markers 124 in the camera view area 126C, as described above with respect to Step S208. The processor uses the value(s) of the optical markers 124 in the camera view area 126C to determine coordinates (indicated by reference numeral 132C in FIG. 6C) that correspond to a center of the camera view area 126C, as described above with respect to Step S212.

In addition, the processor of the system 100 uses a software module to process the image data acquired by the camera unit 114 to determine an orientation of the optical markers 124 with respect to the reference orientation indicated by arrow 125 in FIG. 5C. In the illustrated example, the orientation of the optical markers 124 shown in FIG. 5C with respect to the reference orientation indicated by arrow 125 is zero degrees, since the optical markers 124 are aligned with the reference orientation indicated by arrow 125 in FIG. 5C.

Figure 6C:
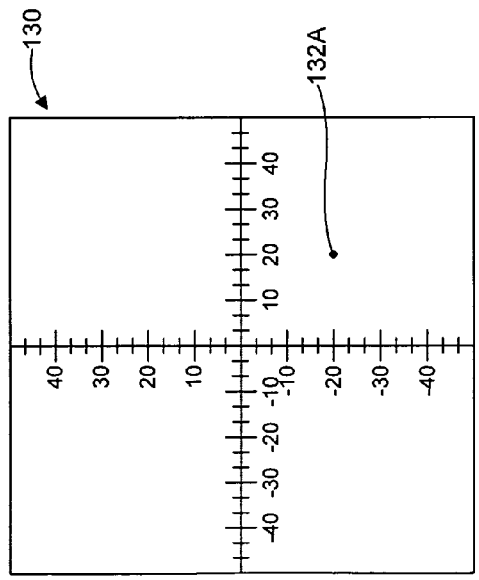

FIG. 6C illustrates a representation of the coordinate system 130 of the optical coding pattern 112. In this example, the center of the camera view area 126C is indicated by reference numeral 132C in FIG. 6C and has coordinates that are determined to be (−20,20). The processor translates the coordinates associated with the center of the camera view area 126C to a corresponding location in the reference coordinate system 140 of the upper surface of the object holder 110. The corresponding location indicated by reference numeral 128C has coordinates that are determined to be (−20,−20), as shown in FIG. 7C.

The processor uses a software module to translate coordinates associated with three-dimensional data 134C (FIG. 8C), which was acquired in the measuring field 118C of FIG. 4C, to corresponding coordinates in the reference coordinate system 140 of the upper surface of the object holder 110 (e.g., Step S216). For example, coordinates associated with the center of the three-dimensional data 134C, which is indicated by reference number 129C in FIG. 8C, are translated to correspond with the coordinates of the location of the center of the measuring field 118C indicated by reference numeral 128C in FIG. 7C.

Second Example: Upper-Left Portion D

Next, the object holder 110 is positioned so that the measuring unit 104 acquires measurement data in a measuring field 118D that includes the upper-left portion D of the object 102, as shown in FIG. 4D. For illustrative purposes, the object holder 110 is rotated by ninety degrees from the orientation shown in FIG. 4C. FIG. 5D illustrates a portion 112D of the optical coding pattern 112 and a camera view area 126D of the camera unit 114, when the object holder is positioned as shown in FIG. 4D.

The processor of the system 100 uses a software module to process image data acquired by the camera unit 114, corresponding to the camera view area 126D, to determine at least one value of at least one of the optical markers 124 in the camera view area 126D, as described above with respect to Step S208. The processor uses the value(s) of the optical markers 124 in the camera view area 126D to determine coordinates (indicated by reference numeral 132D in FIG. 6D) that correspond to a center of the camera view area 126D, as described above with respect to Step S212.

In addition, the processor of the system 100 uses a software module to process the image data acquired by the camera unit 114 to determine an orientation of the optical markers 124 with respect to the reference orientation indicated by arrow 125 in FIG. 5D. In this example, the orientation of the optical markers 124 shown in FIG. 5D with respect to the reference orientation in the coordinate system 130 of the optical coding pattern 112 is two-hundred-seventy degrees in a clockwise direction (ninety degrees in a counter-clockwise direction), as a result of rotating the object holder 110 by ninety degrees in a clockwise direction with respect to the reference orientation in the reference coordinate system 140.

Figure 6D:
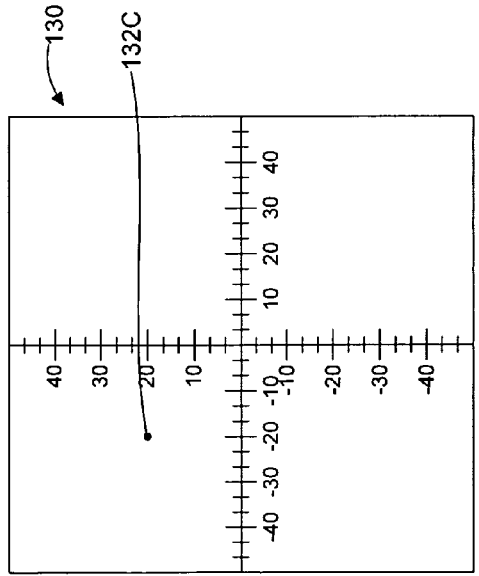

FIG. 6D illustrates a representation of the coordinate system 130 of the optical coding pattern 112. In the illustrated example, the center of the camera view area 126D is indicated by reference numeral 132D in FIG. 6D and has coordinates that are determined to be (−20,−20). The processor uses a software module to translate the coordinates associated with the center of the camera view area 126D to a corresponding location in the reference coordinate system 140 of the upper surface of the object holder 110. The corresponding location indicated by reference numeral 128D has coordinates that are determined to be (−20,20), as shown in FIG. 7D.

The processor translates coordinates associated with three-dimensional data 134D (FIG. 8D) (e.g., Step S216), which was acquired in the measuring field 118D of FIG. 4D, to the reference coordinate system 140. For example, as shown in FIG. 8D, coordinates indicated by reference number 129D correspond to a center of the three-dimensional data 134D, and are translated to the value of the coordinates indicated by reference numeral 128D shown in FIG. 7D.

In addition, the coordinates associated with three-dimensional data 134D are translated by ninety degrees based on the value of the orientation of the optical markers 124 with respect to the reference orientation indicated by arrow 125 in the coordinate system 130 of the optical coding pattern 112. That is, an orientation of the optical markers 124 having a value of two-hundred-seventy degrees with respect to the reference orientation in the coordinate system 130 of the optical coding pattern 112 corresponds to an orientation of ninety degrees with respect to the reference orientation in the reference coordinate system 140 of the upper surface of the object holder 110. Translating the coordinates associated with three-dimensional data 134D based on the orientation of the optical markers 124 ensures that the three-dimensional data 134D are aligned properly with respect to the three-dimensional data 134A, 134B, and 134C, when a composite three-dimensional representation of the object 102 is formed.

Figure 8E:
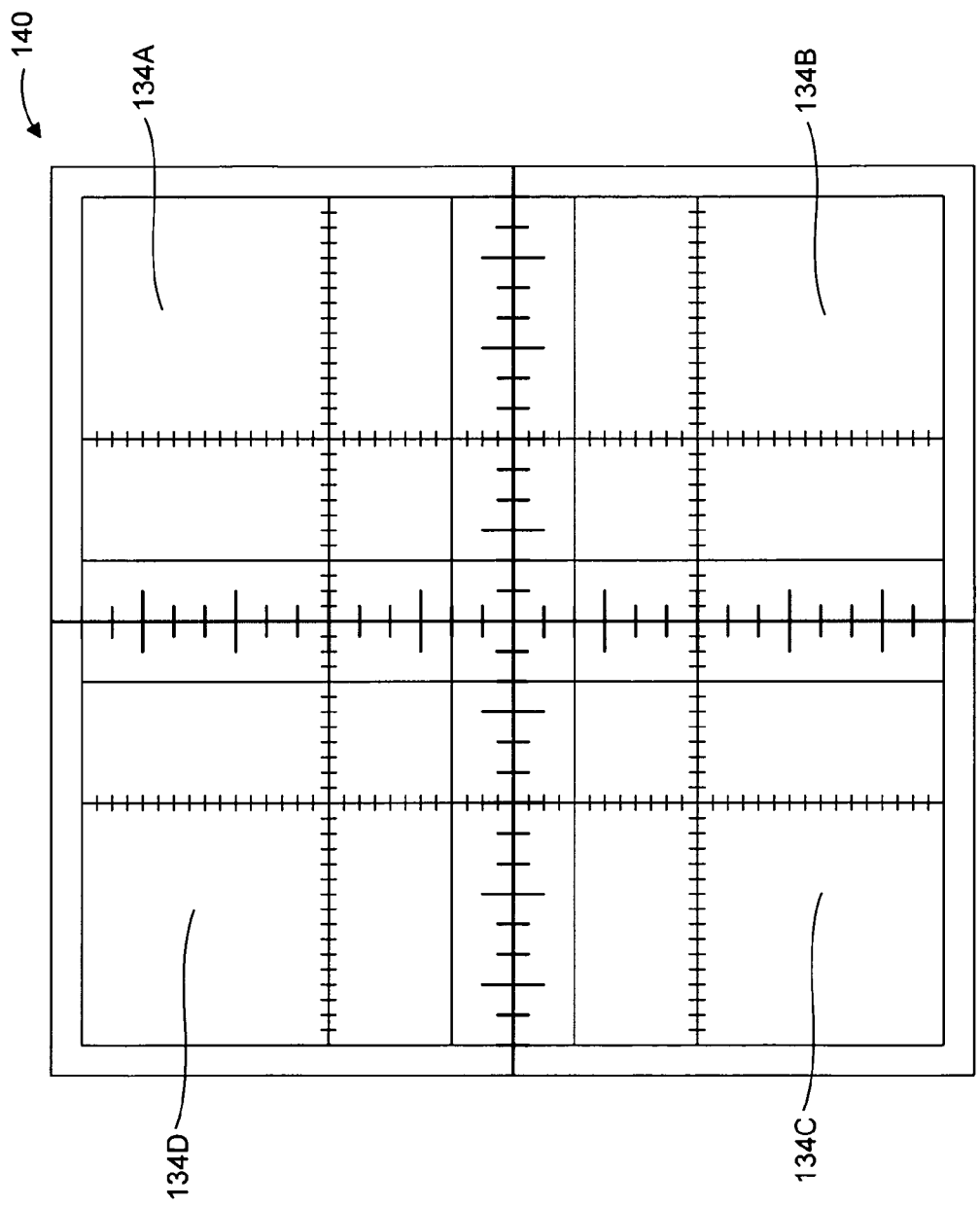
FIG. 8E illustrates composite measurement data resulting from the measurement data illustrated in FIGS. 8A-8D.

The measurement data 134A, 134B, 134C, and 134D respectively include three-dimensional data for portions A, B, C, and D of the object 102. As shown in FIG. 8E, the original coordinates associated with each datum of the measurement data 134A, 134B, 134C, and 134D have been translated to corresponding coordinates in the reference coordinate system 140 of the upper surface of the object holder 110. Accordingly, the coordinates of the measurement data 134A, 134B, 134C, and 134D shown in FIG. 8E are now correlated in the reference coordinate system 140. When the values of the measurement data 134A, 134B, 134C, and 134D and corresponding coordinates in the reference coordinate system 140 are stored in a storage medium, the storage medium contains correlated, composite three-dimensional data for the object 102.

V. Exemplary System Architecture

The present invention (i.e., system 100, or any part(s) or function(s) thereof) may be implemented using hardware, software, or a combination thereof, and may be implemented in one or more computer systems or other processing systems.

Useful machines for performing some or all of the operations of the present invention include general-purpose digital computers or similar devices.

Figure 9:
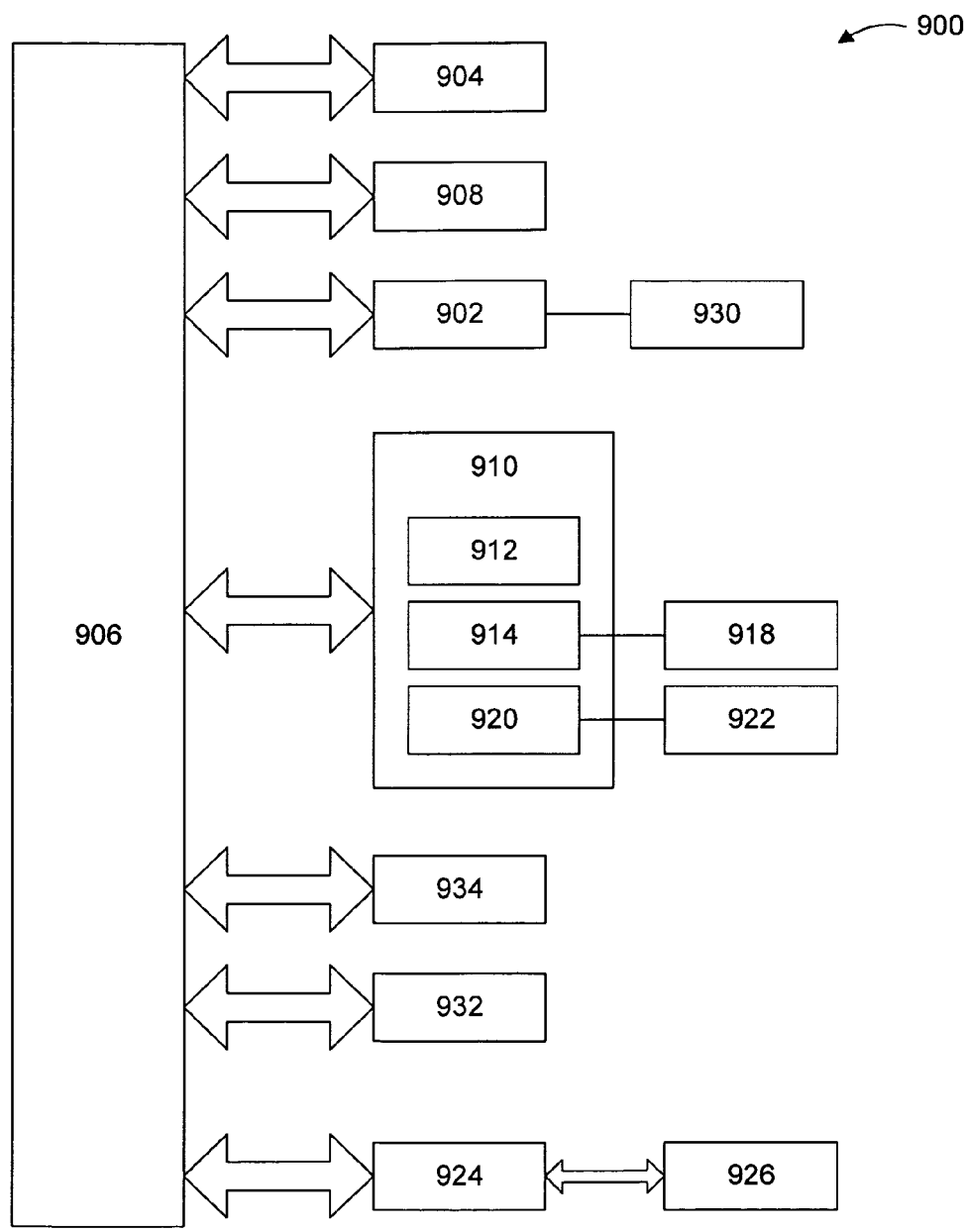
FIG. 9 illustrates a block diagram of a system architecture of a system according to an exemplary embodiment of the invention, that can be used in conjunction with the system illustrated in FIG. 1A.
Figure 10A:
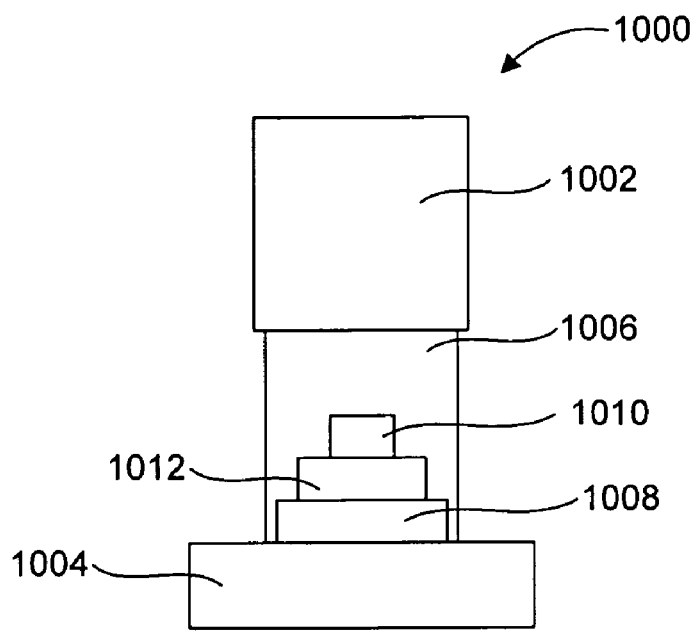
FIGS. 10A and 10B illustrate conventional three-dimensional measuring systems.
Figure 10B:
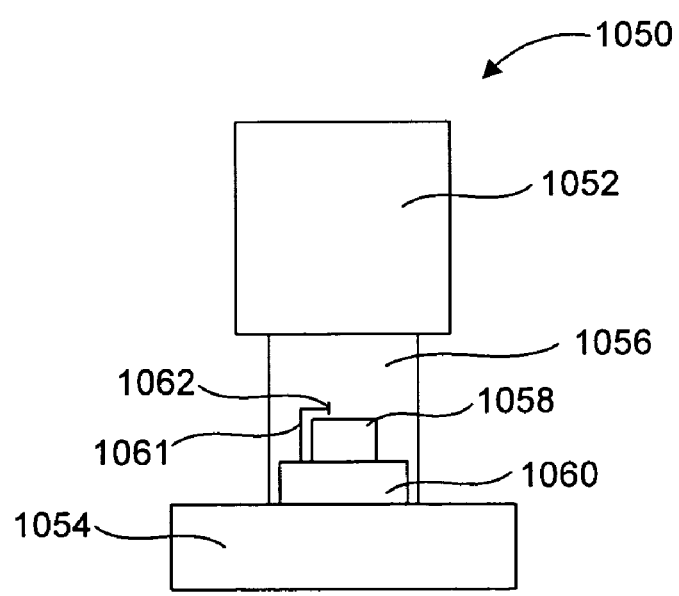

In fact, in one exemplary embodiment, the present invention employs one or more computer systems equipped to carry out the functions described herein. An example of such a computer system 900 is shown in FIG. 9.

Computer system 900 includes at least one processor 904. Processor 904 is connected to a communication infrastructure 906 (e.g., a communications bus, a cross-over bar device, or a network). Although various software embodiments are described herein in terms of this exemplary computer system 900, after reading this description, it will become apparent to a person skilled in the relevant art(s) how to implement the invention using other computer systems and/or architectures.

Computer system 900 includes a display interface (or other output interface) 902 that forwards graphics, text, and other data from communication infrastructure 906 (or from a frame buffer (not shown)) for display on a display unit (or other output unit) 930.

Computer system 900 also includes a main memory 908, which preferably is a random access memory (RAM), and may also include a secondary memory 910. Secondary memory 910 may include, for example, a hard disk drive 912 and/or a removable-storage drive 914 (e.g., a floppy disk drive, a magnetic tape drive, an optical disk drive, and the like). Removable-storage drive 914 reads from and/or writes to a removable storage unit 918 in a well-known manner. Removable storage unit 918 may be, for example, a floppy disk, a magnetic tape, an optical disk, and the like, which is written to and read from by removable-storage drive 914. Removable storage unit 918 can include a computer-usable storage medium having stored therein computer software and/or data.

Computer system 900 also includes a camera unit 932 (e.g., camera unit 114 of FIG. 1A) that captures images and produces image data which is provided to the processor 904, the main memory 908, and/or the secondary memory 910. In addition, the computer system 900 includes a measuring unit 934 (e.g., measuring unit 104 of FIG. 1A) that acquires measurement data that is provided to the processor 904, the main memory 908, and/or the secondary memory 910.

In alternative embodiments, secondary memory 910 may include other similar devices for allowing computer programs or other instructions to be loaded into computer system 900. Such devices may include a removable storage unit 922 and an interface 920 (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 922 and interfaces 920 that allow software and data to be transferred from removable storage unit 922 to computer system 900.

Computer system 900 may also include a communications interface 924, which enables software and data to be transferred between computer system 900 and external devices (not shown). Examples of communications interface 924 may include a modem, a network interface (e.g., an Ethernet card), a communications port (e.g., a Universal Serial Bus (USB) port or a FireWire® port), a Personal Computer Memory Card International Association ("PCMCIA") interface, and the like. Software and data transferred via communications interface 924 are in the form of signals, which may be electronic, electromagnetic, optical or another type of signal that is capable of being transmitted and/or received by communications interface 924. Signals are provided to communications interface 924 via a communications path 926 (e.g., a channel). Communications path 926 carries signals and may be implemented using wire or cable, fiber optics, a telephone line, a cellular link, a radio-frequency ("RF") link, or the like.

As used herein, the phrases "computer program medium" and "computer usable medium" may be used to generally refer to removable storage unit 918 used with removable-storage drive 914, a hard disk installed in hard disk drive 912, and signals, for example. These computer program products provide software to computer system 900. The present invention may be implemented or embodied as one or more of such computer program products.

Computer programs (also referred to as computer control logic) are stored in main memory 908 and/or secondary memory 910. The computer programs may also be received via communications interface 924. Such computer programs, when executed, enable computer system 900 to perform the functions of the present invention, as described herein and shown in, for example, FIG. 2. In particular, the computer programs, when executed, enable the processor 904 to perform the functions of the present invention. Accordingly, such computer programs represent controllers of computer system 900.

In an embodiment where the present invention is implemented using software, the software may be stored in a computer program product and loaded into computer system 900 using removable-storage drive 914, hard drive 912, or communications interface 924. The control logic (software), when executed by processor 904, causes processor 904 to perform the functions of the present invention described herein.

In another exemplary embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s) in view of this description.

In yet another exemplary embodiment, the present invention is implemented using a combination of both hardware and software.

As will be appreciated by those of skill in the relevant art(s) in view of this description, the present invention may be implemented using a single computer or using a computer system that includes multiple computers each programmed with control logic to perform various of the above-described functions of the present invention.

The various embodiments of the present invention described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. For example, other embodiments can be ultrasound or other techniques besides optical imaging. It is also to be understood that the steps and processes recited in the claims need not be performed in the order presented. As but one example, Steps S208 and S210 can be performed in reverse order from that described above, so long as the procedures account therefor.

The foregoing description has been described in the context of exemplary embodiments in which a camera unit acquires two-dimensional image data of a lower surface of an object holder, and wherein spatial characteristics are determined based thereon. However, the present disclosure and invention are not limited to that functionality only. Indeed, it is within the scope of the invention to determine the applicable spatial characteristics based on images taken of other parts of the object holder and/or optical coding pattern, such as, for example, one or more sides thereof. One skilled in the art will appreciate, in view of the present disclosure, how to adapt the various steps of the method(s) described above, if at all, to obtain spatial characteristics based on the obtained images.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A method of evaluating an object disposed on an upper surface of an object holder, the method comprising:
   acquiring at least one first frame representing a captured portion of the object, while the object holder is positioned at each of a plurality of locations, wherein the object is disposed on the upper surface of the object holder;
   acquiring at least one second frame representing a captured portion of at least one other surface of the object holder while the object holder is positioned at each of the plurality of locations; and
   determining at least one spatial characteristic associated with the captured portion of the object, based on at least one of the acquired frames.

2. The method of claim 1, further comprising:
   creating composite data based on the acquired frames.

3. The method of claim 1, wherein the determining includes:
   for each second frame, determining an orientation and coordinates associated with the captured portion of the at least one other surface of the object holder; and
   for each first frame, translating coordinates associated with the captured portion of the object, based on the orientation and the coordinates determined for a corresponding second frame.

4. The method of claim 3, wherein the at least one other surface includes at least one optical marker, and wherein the determining of the orientation and the coordinates includes:
   determining an orientation of at least one optical marker captured in each second frame,
   determining a value of the at least one optical marker captured in each second frame, and
   determining coordinates of a reference point associated with each second frame.

5. The method of claim 4, wherein the reference point associated with each second frame represents a center of the second frame.

6. The method of claim 4, wherein the at least one optical marker includes at least one of a number, a bar code, and a radius of a circle.

7. The method of claim 4, further comprising translating coordinates of the reference point associated with each second frame to a reference coordinate system.

8. The method of claim 1, wherein the at least one other surface is a lower surface of the object holder.

9. The method of claim 2, wherein the composite data forms a three-dimensional representation of the object.

10. The method of claim 2, further comprising storing the composite data in a memory unit.

11. The method of claim 1, wherein each first frame includes measurement data and each second frame includes image data.

12. The method of claim 1, wherein the acquiring of each first frame is performed by measuring optics arranged to acquire three-dimensional data, and the acquiring of each second frame is performed by a camera unit arranged to acquire two-dimensional image data.

13. A system for evaluating an object disposed on an upper surface of an object holder, the apparatus comprising:
    a measuring unit arranged to acquire at least one first frame representing a captured portion of the object, while the object holder is positioned at each of a plurality of locations, wherein the object is disposed on the upper surface of the object holder;
    a camera unit arranged to acquire at least one second frame representing a captured portion of at least one other surface of the object holder while the object holder is positioned at each of the plurality of locations; and
    a processing unit operable to determine at least one spatial characteristic associated with the captured portion of the object, based on at least one of the acquired frames.

14. The system of claim 13, wherein the processing unit also is operable to form composite data based on the acquired frames.

15. The system of claim 13, wherein for each second frame, the processing unit also is operable to determine an orientation and coordinates associated with the captured portion of the at least one other surface of the object holder, and
    wherein the processing unit further is operable to translate, for each first frame, coordinates associated with the captured portion of the object, based on the orientation and the coordinates determined for a corresponding second frame.

16. The system of claim 15,
    wherein the at least one other surface includes at least one optical marker, and
    wherein the processing unit, for each second frame, also is operable to determine an orientation of at least one optical marker captured in each second frame, determine a value of the at least one optical marker captured in each second frame, and determine coordinates of a reference point associated with each second frame.

17. The system of claim 16, wherein the reference point associated with each second frame represents a center of the second frame.

18. The system of claim 16, wherein the at least one optical marker includes at least one of a number, a bar code, and a radius of a circle.

19. The system of claim 16, wherein the processing unit also is operable to translate coordinates of the reference point associated with each second frame to a reference coordinate system.

20. The system of claim 13, wherein the at least one other surface is a lower surface of the object holder.

21. The system of claim 14, wherein the composite data forms a three-dimensional representation of the object.

22. The system of claim 14, further comprising a memory unit arranged to store the composite data formed by the processing unit.

23. The system of claim 13, wherein each first frame includes measurement data and each second frame includes image data.

24. The system of claim 13, wherein the measuring unit includes measuring optics to acquire three-dimensional measurement data, and the camera unit acquires two-dimensional image data.

25. The system of claim 13, wherein an optical coding pattern including plural optical markers is formed at the at least one other surface of the object holder.

26. The system of claim 13, wherein the object is a dental structure.

27. A computer program product comprising a non-transitory computer-usable medium having control logic stored therein for causing a computer to determine spatial characteristics, the control logic comprising:
   computer-readable program code for causing the computer to determine at least one spatial characteristic associated with a captured portion of an object disposed on an upper surface of an object holder, based on at least one of acquired first and second frames, the first frames respectively representing the portion of the object captured while the object holder is positioned at each of a plurality of locations, wherein the object is disposed on the upper surface of the object holder, the second frames respectively representing a captured portion of at least one other surface of the object holder while the object holder is positioned at each of the plurality of locations.

28. The computer program product of claim 27, wherein the code for causing the computer to determine comprises:
   computer-readable program code for causing the computer to determine, for each second frame, an orientation and coordinates associated with the captured portion of the at least one other surface of the object holder, and
   computer-readable program code for causing the computer to translate coordinates associated with each first frame, wherein the coordinates associated with each first frame are translated based on the orientation and the coordinates determined for a corresponding second frame.

* * * * *